United States Patent [19]
Matzinger

[11] Patent Number: 6,020,399
[45] Date of Patent: Feb. 1, 2000

[54] HYBRID POLYMERS FOR PHASE CHANGE INK JET INKS AND METHOD OF PRINTING THEREWITH

[75] Inventor: Michael D. Matzinger, Mt. Pleasant, S.C.

[73] Assignee: Westvaco Corporation, New York, N.Y.

[21] Appl. No.: 09/093,040

[22] Filed: Jun. 5, 1998

[51] Int. Cl.[7] .......................... C09D 11/02; C09D 11/10; C08G 63/44; C08G 63/91
[52] U.S. Cl. ................... 523/160; 525/54.21; 525/54.23; 525/54.44
[58] Field of Search ..................... 523/160, 161; 106/31.29, 31.3, 31.31, 31.61, 31.62, 31.63, 31.37, 31.69, 31.41, 31.43, 31.38, 31.68, 31.27, 31.6; 525/54.21, 54.23, 54.44; 527/401

[56] References Cited

U.S. PATENT DOCUMENTS

| | | | |
|---|---|---|---|
| 4,415,703 | 11/1983 | Toba et al. | 524/54.21 |
| 4,417,025 | 11/1983 | Toba et al. | 525/54.21 |
| 4,684,956 | 8/1987 | Ball | 347/88 |
| 5,066,332 | 11/1991 | Brown et al. | 106/31.3 |
| 5,122,187 | 6/1992 | Schwarz et al. | 106/31.29 |
| 5,145,518 | 9/1992 | Winnik et al. | 523/161 |
| 5,286,288 | 2/1994 | Tobias et al. | 106/31.29 |
| 5,397,388 | 3/1995 | Fujioka | 106/31.29 |
| 5,403,391 | 4/1995 | Womack | 523/161 |
| 5,560,765 | 10/1996 | Sawada | 106/31.3 |
| 5,574,078 | 11/1996 | Elwakil | 523/161 |
| 5,620,508 | 4/1997 | Yamano et al. | 524/275 |
| 5,640,187 | 6/1997 | Kashiwazaki et al. | 347/101 |
| 5,663,217 | 9/1997 | Kruse | 523/161 |
| 5,713,989 | 2/1998 | Wickramanayake et al. | 106/31.6 |
| 5,746,817 | 5/1998 | Katsen et al. | 106/31.65 |
| 5,788,751 | 8/1998 | Sawada | 106/31.29 |
| 5,830,942 | 11/1998 | King et al. | 524/590 |
| 5,835,116 | 11/1998 | Sato et al. | 347/98 |
| 5,879,439 | 3/1999 | Nagai et al. | 106/31.28 |
| 5,882,724 | 3/1999 | Rourke et al. | 427/150 |

*Primary Examiner*—Vasu Jagannathan
*Assistant Examiner*—Callie E. Shosho
*Attorney, Agent, or Firm*—Terry B. McDaniel; Daniel B. Rece, IV; Richard L. Schmalz

[57] ABSTRACT

Phase change (hot melt) ink compositions for use in a phase change (hot melt) ink jet recording device in which recording is conducted by thermally melting the ink at a temperature above ambient temperature (20° C.) to provide prints that possess high quality images, scratch resistance, abrasion resistance, low-temperature storage stability and flexibility, offset and pick resistance, adhesion, and other desired properties are disclosed to comprise:

(a) from about 0.1% to about 30% of one or more colorants; and (b) from about 0.1 to about 99.9% of one or more hybrid polymers.

Components other than those listed above may be included in the ink compositions to achieve specific printer, substrate, or end use requirements. Furthermore, the present invention also includes methods for the preparation of hybrid polymers and for their use in the above-described inks.

41 Claims, No Drawings

HYBRID POLYMERS FOR PHASE CHANGE INK JET INKS AND METHOD OF PRINTING THEREWITH

BACKGROUND OF THE INVENTION

1. Field of the Invention

This invention relates to ink jet inks for use in ink jet printers. More particularly, this invention relates to phase change, or hot melt, ink jet inks for use in ink jet printers from which ink is propelled from the printer nozzle by heat or by a pressure wave.

2. Description of Related Art (Including Information Disclosed Under 37 CFR 1.97 and 37 CFR 1.98)

Ink jet printing involves the placement in response to a digital signal of small drops of a fluid ink onto a surface to form an image without physical contact between the printing device and the surface. The method of drop generation varies among the different ink jet technologies and can be used to classify ink jet printing into two major technology types, continuous (CIJ) and drop-on-demand (DOD).

In CIJ printing systems, a continuous stream of liquid ink droplets is ejected from a nozzle and is directed, with the assistance of an electrostatic charging device in close proximity to the print head, either to a substrate to form a printed image or to a recirculating system. Inks for CIJ printing systems are typically based on solvents such as methyl ethyl ketone and ethanol.

In DOD ink jet printing systems, liquid ink droplets are propelled from a nozzle by heat (thermal or bubble ink jet) or by a pressure wave (piezo ink jet). Unlike CIJ systems, all the ink droplets are used to form the printed image and are ejected when needed, "on demand." No deflection of ink droplets is involved. Thermal or bubble ink jet inks typically are based on water and glycols. Piezo ink jet systems generally use aqueous, solvent, or solid inks. These last inks, also known as phase change inks, are solid at ambient temperature and liquid at printing temperatures. It is these inks to which the present invention relates.

The following properties are required of an ink composition for ink jet printing:

(a) high quality printing (edge acuity and optical density) of text and graphics on substrates, in particular, on uncoated cellulosic paper, (b) short dry time of the ink on a substrate and good adhesion such that after printing the print is not smudged when rubbed or offset onto a subsequent printed image placed upon the print, (c) good jetting properties exhibited by a lack of deviation of ink droplets from the flight path (misplaced dots) and of ink starvation during conditions of high ink demand (missing dots), (d) resistance of the ink after drying on a substrate to water and to solvents, (e) long-term storage stability (no pigment settling) and (f) long-term reliability (no corrosion or nozzle clogging).

Inks are known that possess one or more of the above listed properties. However, few inks are known that possess all of the above listed properties. Often, the inclusion of an ink component meant to satisfy one of the above requirements can prevent another requirement from being met. For example, the inclusion of a polymer in the ink composition can improve the adhesion of the ink to the substrate. However, the polymer can impair the jetting of the ink because of the behavior of the polymer under the high shear conditions of jetting ($10^4$–$10^6$ sec$^{-1}$). Thus, most commercial ink jet inks represent a compromise in an attempt to achieve at least an adequate response in meeting all of the above listed requirements.

The use of polymers in phase change (hot melt) inks and the printing of such inks has been disclosed in the following publications:

U.S. Pat. No. 5,006,170 teaches the use of "rosin esters" with a colorant and a propellant.

U.S. Pat. No. 5,531,819 teaches the use of an "acrylic resin," "rosin resin," "hydrogenated rosin resin," "petroleum resin," "hydrogenated petroleum resin," "or "terpene resin" with a wax, a colorant, and a plasticizer.

U.S. Pat. No. 5,354,368 discloses the use of a "tall oil rosin having a high acid number" with a rheology modifier. Given as examples of "tall oil rosin" are "natural tall oil and wood rosins as well as modified tall oil and wood rosins and tall oil and wood rosin derivatives."

U.S. Pat. No. 5,397,388 teaches the use of "acrylic resin," "rosin resin," "petroleum resin," "modified petroleum resin," "hydrogenated petroleum resin," or "terpene resin," with a wax, an organic substance miscible with the wax, and a colorant.

U.S. Pat. No. 5,409,530 teaches the use of a resin selected from the group consisting of "rosins, rosin derivatives, terpenes, [or] modified terpenes . . . " with a second component to dissolve the resin.

U.S. Pat. No. 5,514,209 discloses the use of a "glycerol ester of a hydrogenated rosin" with a microcrystalline wax.

U.S. Pat. No. 5,620,508 teaches the use of "rosin-type resins" with pigments and oil-soluble dyes. Given as examples of rosin-type resins are "rosins, hydrogenated rosins, disproportionated rosins, rosin esters, rosin-modified phenolic resins, rosin-modified maleic acid resins, and rosin-modified xylene resins."

Also, EP 0 739 958 A2 teaches the use of an "acrylic resin," "rosin resin," "petroleum resin," "modified petroleum resin," "hydrogenated petroleum resin," or "terpene resin," with at least one wax, a colorant, and a second resin. One resin has a softening point from room temperature to 100° C., and the other resin has a softening point from 50° C. to 1 50° C.

While the prior art teaches the use of many classes of polymers in phase change (hot melt) inks, the ability of using different classes of polymers within the same ink composition can be limited due to compatibility of the polymers with each other. Furthermore, printed images made with inks that contain certain polymers that have poor quality images and lack scratch resistance, low-temperature storage stability and flexibility, offset and pick resistance, adhesion, and other desired properties.

The essential component of the present invention is a hybid polymer. This polymer is prepared by chemically attaching one class of polymer to another. For example, a useful polymer is one that has an acrylic polymer attached to a rosin polymer. The novel aspect of using a hybrid polymer in a phase change (hot melt) ink is that it allows two polymers that are incompatible when added individually in the ink composition to be rendered compatible in the ink composition when used in the state in which the polymers are chemically joined together. This allows the unique property enhancing attributes of two incompatible polymers to be exploited in the same ink composition. Such hybrid polymers suitable for phase change (hot melt) inks are unknown. Hybrid polymers can be used as the sole polymer of the ink composition, in combination with other hybrid polymers, or in combination with other polymers.

In accordance with the present invention, the preparation of phase change (hot melt) inks useful in ink jet printing devices is provided. The phase change (hot melt) inks preferably are for use in a piezo ink jet printer with which recording is conducted by thermally melting an ink composition at a temperature above ambient temperature (20° C.) and then ejecting the ink composition onto a porous or non-porous substrate such as paper, aluminum, glass, metal, wood, synthetic polymer films, and textiles. Furthermore, the present invention also provides methods for the preparation of hybrid polymers and for their use in the above-described inks.

The present invention overcomes many of the problems associated with the use of prior art phase change (hot melt) ink compositions while achieving distinct advantages thereof. Accordingly, an object of the present invention is to provide improved ink compositions capable of satisfying simultaneously the properties required of an ink composition for ink jet printing, especially the aforementioned properties (a) to (f) and which comprise a hybrid polymer. Other objects and advantages of the present invention will become apparent from the following disclosure.

SUMMARY OF THE INVENTION

In accordance with the present invention, the preparation of phase change (hot melt) inks useful in ink jet, hot melt gravure, and similar printing devices is provided. The phase change (hot melt) inks preferably are for use in a phase change (hot melt) ink jet recording device in which recording is conducted by thermally melting the ink at a temperature above ambient temperature (20° C.) to provide prints that possess high quality images, scratch resistance, abrasion resistance, low-temperature storage stability and flexibility, offset and pick resistance, adhesion, and other desired properties. Furthermore, the present invention also includes methods for the preparation of hybrid polymers and for their use in the above-described inks.

In accordance with the present invention, the ink compositions comprise:

(a) from about 0.1% to about 30% of one or more colorants; and (b) from about 0.1 to about 99.9% of one or more hybrid polymers.

Components other than those listed above may be included in the ink compositions to achieve specific printer, substrate, or end use requirements.

DESCRIPTION OF THE PREFERRED EMBODIMENT(S)

The phase change (hot melt) inks of the present invention comprise a colorant and a hybrid polymer. Other components that may be added, include but are not limited to, waxes, polymers, antioxidants, biocides, and corrosion inhibitors.

Colorants

Coloring agents that may be incorporated in the ink composition include pigments and dyes. Any dye or pigment or combination of one or more dyes or pigments may be used as long as the colorant can be dispersed in the ink composition and is compatible with the other components of the composition. The coloring material of the present invention is preferably a pigment.

No particular limitation is imposed on the type or the amount of pigment used. The term "pigment" refers to a solvent insoluble colorant. A large range of pigments, organic and inorganic, may be used either alone or in combination. Pigments used in ink jet inks typically are in the dispersed state and are kept from agglomerating and settling out of the carrier medium by placing acidic or basic functional groups on the surface of the pigments, attaching a polymer onto the surface of the pigments, or adding a surfactant to the ink.

The amount of the pigment present in the ink compositions is from about 0.1 to 30 wt %, preferably from about 2 to 10 wt %. Examples of a pigment that may be used in the practice of the present invention for a yellow ink include C.I. Pigment Yellow 1, C.I. Pigment Yellow 3, and C.I. Pigment Yellow 13. Examples of a pigment that may be used in the present invention for a magenta ink include C.I. Pigment Red 5, C.I. Pigment Red 7, C.I. Pigment Red 12, C.I. Pigment Red 112, and C.I. Pigment Red 122. Examples of a pigment that may be used in the present invention for a cyan ink include C.I. Pigment Blue 1, C.I. Pigment Blue 2, C.I. Pigment Blue 16, C.I. Vat Blue 4, and C.I. Vat Blue 6.

The pigment particles need to be small enough in size so that they move freely through the printing device. Because the ejecting nozzles of ink jet ink printers range in diameter from about 10 to 100 microns, pigments suitable for use in the present invention may have a range of particle sizes from about 0.01 microns to 100 microns, preferably from about 0.01 microns to 10 microns, and more preferably from about 0.01 microns to 5 microns.

No particular limitation is imposed on the type or the amount of dye used. Dyes which are useful in the present invention are those which are water soluble or water-insoluble such as basic, acid, and direct dyes. If desired, the dyes can be reactive dyes which contain groups capable of forming covalent bonds with textile materials. The amount of dye present in the ink compositions is from about 0.1 to 30 wt %, preferably from about 2 to 10 wt %.

Fine particles of metal or metal oxides also may be included as colorants for the compositions of the present invention. Metal and metal oxides are used in the preparation of magnetic ink jet inks. Examples may include silica, alumina, titania, and finely divided copper.

Hybrid Polymers

The essential component of the present invention is a hybrid polymer. This polymer is prepared by chemically attaching one class of polymer to another. The novel aspect of using a hybrid polymer in a phase change (hot melt) ink is that it allows two polymers that are incompatible in the ink formulation to be rendered compatible in the ink formulation when used in the state in which the polymers are chemically joined to each other. This allows the unique property enhancing attributes of two incompatible polymers to be exploited in the same ink composition. Hybrid polymers can be used as the sole polymer of the ink formulation or in combination with other polymers, including other hybrid polymers.

The polymers suitable for use in the present inventions may include naturally occurring polymers such as alginic acid, carboxymethyl cellulose, and pectinic acid; synthetic analogues of naturally occurring polymers such as rosin esters, lignosulfanates, nitrocellulose, and alcohol-soluble polysaccharides; synthetic polymers such as polyacrylamide, polyacrylic acid, polyethylene oxide, polyethylene glycol, polymethacrylic acid, polyitaconic acid, polymaleic acid, polyvinyl alcohol, and polyvinyl methyl ether; and synthetic copolymers such as styrene/acrylic acid, ethylene/vinyl acetate, acrylic acid/N-vinyl pyrrolidinone, and vinylnaphthalene/itaconate copolymers. The copolymers may be block, graft, tapered, branched, and random copolymers. Methods of polymerization include solution, emulsion, suspension, and bulk polymerization. While physical properties of the polymers can be affected by the polymerization method, the resultant polymers can provide the desired outcomes of the invention.

No particular limitation is imposed on the physical properties of the polymers. Preferred polymers are those having an acid number in the range of from about 10 to 300, a weight average molecular weight in the range of from about 500 to 250,000, a softening point in the range of from about 0 to 150° C., and a glass transition temperature of in the range of from about −25 to 1 80° C. More preferred polymers are those having an acid number in the range of from about 20 to 80, a weight average molecular weight in the range of from about 2000 to 35,000, a softening point in the range of from about 40 to 90° C., and a glass transition temperature from about 25 to 80° C.

Waxes

Any one of known waxes may be used in the phase change (hot melt) ink formulation with no particular restriction. A preferred wax is solid at room temperature and is molten sufficiently at the operating temperature of the printing device. Examples of suitable waxes include petroleum waxes, such as paraffin wax and micro crystalline wax; plant waxes, such candelilla wax and carnauba wax; animal waxes, such as bees wax and lanolin; synthetic hydrocarbon waxes, such as a Fisher-Tropsch wax and a polyethylene wax; higher fatty acids, such as stearic acid and lauric acid; higher alcohols, such as stearyl alcohol and 12-hydroxystearic acid; and derivatives thereof and combinations thereof. These waxes may be used alone in the ink formulation or admixed with one or more other waxes.

Polymers

Polymers used in phase change (hot melt) inks of the present invention generally have melting points in the range of about 40° C. to 200° C., and preferably from about 60° C.to 140° C. The polymer should be thermally stable in a molten state so that gaseous products are not generated or deposits on the printer device are not formed.

Examples of suitable polymers for ink compositions of the present invention include, but are not limited to, one or more of the following: alkyd resins; amides; acrylic polymers; benzoate esters; citrate plasticizers; cumarone-indene resins; dimer fatty acids; epoxy resins; fatty acids; ketone resins; maleate plasticizers; long chain alcohols; olefin resins; petroleum resins; phenolic resins; phthalate plasticizers; polyesters; polyvinyl alcohol resins; rosins; styrene resins; sulfones; sulfonamides; terpene resins; urethanes; vinyl resins; and derivatives thereof and combinations thereof. No limitation is placed on the type or the amount of the polymer that is present in the ink.

Antioxidants

Phase change (hot melt) ink compositions prepared in accordance with the present invention are in a molten state during printing. To prevent thermally induced oxidation from occurring in this state, antioxidants may be added to the ink composition. Suitable antioxidants, present preferably in the amount of about 0.1% to 1.0% by weight of the ink composition, include, for example, Irganox® 1010 and Iragofos® 168 (Ciba-Geigy Corp.).

Biocides

To prevent the growth of microorganisms, a biocide may be added, preferably in the range of about 0.01% to 5%, based on the weight of the ink composition. Examples of suitable biocides include sorbic acid, vinylenebisthiocyanate, bis(trichloromethyl)sulfone, and zinc pyridinethione.

Corrosion Inhibitors

One or more corrosion inhibitors may be added to inhibit the corrosion of the metal that comes in contact with the phase change (hot melt) ink. Suitable corrosion inhibitors, present preferably in the range of about 0.1% to 5% (based on the weight of the ink composition), include ammonium dinonyl naphthalene sulphonate.

Methods of Ink Preparation and Desired Ink Properties

No limitation is placed on the way in which the components of the phase change (hot melt) ink compositions of the present invention are combined in the preparation of the compositions. A preferred method involves adding all the components, except the colorant and the hybrid polymer, heating the components at about 135° C., while slowly stirring, until a homogenous mixture is obtained. Then, under the same conditions, the hybrid polymer is added at a rate such that a homogenous mixture is obtained. In this manner, more of the hybrid polymer can be incorporated into the ink composition. The coloring agent (pigment) is subsequently added and stirring and heating are continued until the colorant is properly dispersed. If a greater degree of dispersion is desired, a dispersing machine such as a three roll mill, an attritor, a ball mill, or a colloid mill can be used. The molten mixture is then filtered to remove particles of a size too large for effective printing.

Inks suitable for use with phase change (hot melt) ink jet printers should be solid at room temperature, by which is meant about 18° C. to about 27° C., and are transformed into a molten state at temperatures ranging from 45° C. to 150° C. Most preferably these inks should melt from about 65° C. to 130° C. The phase change inks also should exhibit a relatively low melt viscosity of 1 to 50 cP between 100° C. and 150° C., most preferably 5 to 20 cP. The inks also should exhibit excellent dispersion and stability of this dispersion, especially when exposed to the elevated temperatures at which the ink is commonly stored and jetted in the printing device. The ink compositions of the present invention meet the aforementioned requirements.

Inks suitable for use with hot melt (phase change) ink jet printers should provide prints with excellent quality (good edge acuity and high optical density), and there should be no missing or misplaced dots. The inks should dry quickly onto the printed substrate as well as adhere well to said substrate to provide a print with resistance to abrasion, water, and solvents. The ink compositions of the present invention meet these requirements.

The ink compositions of the present invention possess desirable non-Newtonian properties. That is, these inks exhibit a relatively high viscosity at relatively low shear rates, e.g., 12 cP or more, but a much reduced viscosity at relatively high shear rates, e.g., $10^4$ $sec^{-1}$ or more. The high viscosity at low shear helps to keep the colorant in suspension when the ink is being stored whereas the low viscosity at high shear reduces the energy required to eject the ink droplet from the printhead.

Methods of Printing

The compositions of the present invention may be used in phase change (hot melt) ink jet, hot melt gravure, and similar printing methods. A preferred method of printing involves phase change (hot melt) ink jet printing using piezo ink jet printers. The specific ink jet printer employed is not critical.

Substrates

No limitation is placed on the substrate that can be used in the practice of the present invention. The compositions of this invention can be applied to a wide range of porous and non-porous substrates such as paper, aluminum, glass, metal, wood, synthetic polymer films, and textiles. The temperature of the substrate can be adjusted to improve properties such as print quality and adhesion. For example, the substrate can be passed through heated rollers subsequent to printing to improve print quality by increasing dot gain. Also, the temperature of the ink ejected from the printer can be raised so that when it comes into contact with a compliant substrate, such as plastic, enhanced adhesion can occur due to partial fusing.

Specific embodiments of the phase change (hot melt) inks of the present invention are provided in further detail herein below. These examples are intended to be illustrative, and the invention is not limited to the materials set forth in these embodiments. All parts are by weight unless otherwise noted.

EXAMPLE 1

Preparation of Hydrocarbon Polymer 7173-69

To a one-gallon Parr reactor were charged 2100 parts of dicyclopentadiene (DCPD) and 900 parts of LRO-90, both products of Lyondell Chemical Corporation. The contents were heated to 105° C. over a 30-minute period while sparging with nitrogen. Then, the nitrogen was turned off, the reactor was sealed, and the temperature was increased to 275° C. over a 2.5-hour period and was maintained at that temperature for a five-hour period. The temperature of the polymer was allowed to cool to 180° C. over a 30-minute period and then the polymer was discharged.

EXAMPLE 2

Preparation of Hydrocarbon/Acrylic Hybrid Polymer 7521-11

To a one-gallon Parr reactor was added 1065 parts of dicyclopentadiene (DCPD), 450 parts of LRO-90, 55 parts of Neodene 16 (Shell Oil Company), and 350 parts of acrylic polymer JONREZ® H-2704 (manufactured and marketed by Westvaco Corporation). The contents were heated to a temperature of 105° C. and held for a period of 30 minutes at that temperature while sparging with nitrogen. The nitrogen was turned off, the reactor was sealed, and the contents were heated to a temperature of 260° C. The temperature was maintained at 260° C. for a period of five hours and then was allowed to cool to a temperature of 190° C. The contents were brought to atmospheric pressure and were discharged into a three-liter, five-neck, round-bottom flask equipped with an overhead stirrer, a thermocouple, a nitrogen sparge tube, a stopper, and a Dean-Stark trap and condenser. The contents of the flask were heated to a temperature of 260° C. while sparging with nitrogen. The nitrogen sparge was continued at 260° C. for approximately four hours until no further distillate was collected in the Dean-Stark trap. The resulting polymer had an acid number of 2.8, a ring and ball softening point of 131° C., a DSC glass transition temperature of 75° C., a weight average molecular weight of 6600, a polydispersity of 4.1, a Gardner color value of 12, and a Brookfield viscosity at 150° C. of greater than 10,000 cP (#18 spindle).

EXAMPLE 3

Preparation of Phase Change Ink 7521-36

To a 500-mL, five-neck, round-bottom flask equipped with an overhead stirrer, a nitrogen delivery tube, a thermocouple, and a stopper were added 60.1 parts of Versamid® 754 (a dimer acid-based polyamide resin product of Henkel), 35.4 parts of paraffin wax, and 52.3 parts of Hallcomide® M-18-OL (N,N-dimethyl oleoamide, a product of The C. P. Hall Co.). The contents were heated to a temperature of 135° C. under a nitrogen atmosphere. Then, 7.0 parts of hydrocarbon polymer 7173-69 were added over a one-hour period. The contents were maintained at a temperature of 135° C. for an additional hour.

EXAMPLE 4

Preparation of Phase Change Ink 7521-37

To a 500-mL, five-neck, round-bottom flask equipped with an overhead stirrer, a nitrogen delivery tube, a thermocouple, and a stopper were added 35.4 parts of paraffin wax, 52.3 parts of Hallcomid® M-18-OL, and 60.1 parts of Versamid® 754. The contents were heated to a temperature of 135° C. under a nitrogen atmosphere. Then, 5.0 parts of acrylic polymer JONREZ® H-2704 were added over a one-hour period. The contents were maintained at a temperature of 135° C. for an additional hour.

EXAMPLE 5

Preparation of Phase Change Ink 7521-38

To a 500-mL, five-neck, round-bottom flask equipped with an overhead stirrer, a nitrogen delivery tube, a thermocouple, and a stopper were added 35.4 parts of paraffin wax, 52.3 parts of Hallcomid® M-18-OL, and 60.1 parts of Versamid® 754. The contents were heated to a temperature of 135° C. under a nitrogen atmosphere. Then, 4.0 parts of hybrid polymer 7521-11 and 1.0 parts of JONREZ® H-2704 were added over a one-hour period. The contents were maintained at a temperature of 135° C. for an additional hour.

EXAMPLE 6

Preparation of Phase Change Ink 7536-06

To a 500-mL, five-neck, round-bottom flask equipped with an overhead stirrer, a nitrogen delivery tube, a thermocouple, and a stopper were added 35.4 parts of paraffin wax, 52.3 parts of Hallcomid® M-18-OL, and 60.1 parts of Versamid® 754. The contents were heated to a temperature of 135° C. under a nitrogen atmosphere. Then, 42 parts of hydrocarbon/acrylic hybrid polymer 7521-11 were added over a two-hour period and stirred for 1 hour at 135° C. The contents were maintained at a temperature of 135° C. for an additional hour.

EXAMPLE 7

Hydrocarbon polymers provide phase change (hot melt) inks with flexibility and acrylic polymers provide adhesion and abrasion resistance. However, in some ink systems, the incorporation of both polymers at a level that permits the benefit of both polymers to be achieved cannot be accomplished due to incompatibility of the polymers. As an example, a composition consisting of 35.4 grams of paraffin, 52.3 grams of Hallcomid® M-18-OL, and 60.1 grams of Versamid® 754, was prepared. When 7.0 grams or more of hydrocarbon polymer 7173-69 (Example 1) was added to the composition, an incompatible ink system was obtained (Example 3). Likewise, adding 5.0 grams or more of acrylic polymer JONREZ® H-2704 to the same composition also results in an incompatible ink system (Example 4).

By chemically attaching together 82 wt % of hydrocarbon monomers and 18 wt % of acrylic polymer JONREZ® H-2704, however, hydrocarbon/acrylic hybrid polymer 7521-11 was obtained (Example 2). This hybrid polymer was added at a level of 42.3 parts to the previously described composition without an incompatible system resulting (Example 6). Adding the hybrid polymer to the composition is equivalent to adding 7.6 grams of acrylic polymer JONREZ® H-2704 and 34.7 grams of hydrocarbon polymer 7136-69.

To demonstrate the uniqueness of the hybrid approach in achieving a compatible ink system, a blend of 4.0 parts of hydrocarbon polymer 7136-69 (Example 1) and 1.0 part of acrylic polymer JONREZ® H-2704 was added to the same composition (Example 5). In this case, an incompatible ink system was obtained. Thus, a much greater amount of an acrylic polymer and a hydrocarbon polymer can be added to a wax/fatty acid-based phase change ink-jet ink formulation in the hybrid form than as a blend. The comparisons described in Examples 1–7 are summarized in Table I.

TABLE I

Phase Change Ink-Jet Ink Formulas

|  | Ink 7521-36 | Ink 7521-37 | Ink 7521-38 | Ink 7536-06 |
|---|---|---|---|---|
| Paraffin, parts | 35.4 | 35.4 | 35.4 | 35.4 |
| Hallcomid ® M-18-OL, parts | 52.3 | 52.3 | 52.3 | 52.3 |
| Versamid ® 754, parts | 60.1 | 60.1 | 60.1 | 60.1 |
| Polymer 7173-69, parts | 7.0 |  | 4.0 |  |
| JONREZ ® H-2704, parts |  | 5.0 | 1.0 |  |
| Hybrid Polymer 7521-11, parts |  |  |  | 42.3 |
| Compatible | no | no | no | yes |

EXAMPLE 8

Preparation of Rosin Polymer 7485-70

To a three-liter, five-neck, round-bottom flask equipped with an overhead stirrer, a thermocouple, a condenser, and two stoppers were added 1000 parts of Westvaco Corporation's Rosin SS and 49 parts of Westvaco Corporation's L5 fatty acid. The contents of the flask were heated to a temperature of 185° C. At a temperature of 185° C., 60 parts of maleic anhydride (from Aldrich Chemical Company) were added. The temperature was increased to 205° C. and was maintained for one hour. Then, 144 parts of glycerol (Aldrich) and 1.3 parts of magnesium oxide (Aldrich) were added. A Dean-Stark trap was attached to the flask and the contents of the flask were heated to a temperature of 275° C. over a one-hour period. The temperature was held at 275° C. for a period of two hours. The resulting polymer had an acid number of 22, a ring and ball softening point of 86° C., a DSC glass transition temperature of 39° C., a weight average molecular weight of 1500, a polydispersity of 1.5, a neat Gardner color value of 11, and a Brookfield viscosity at 135° C. of 2200 cP (#18 spindle).

EXAMPLE 9

Preparation of Rosin/Acrylic Hybrid Polymer 7490-97

To a three-liter, five-neck, round-bottom flask equipped with an overhead stirrer, a thermocouple, a condenser, and two stoppers were added 950 parts of Rosin SS and 225 parts of L1A Special fatty acid. The contents were heated to a temperature of 185° C. Then, 40 parts of maleic anhydride were added. The temperature was increased to 205° C. and was maintained for a period of one hour. Then, 10 parts of glycerol, 20 parts of pentaerythritol (Aldrich), and 2 parts of magnesium oxide were charged. A Dean-Stark trap was attached and the contents were heated to a temperature of 275° C. over a one-hour period. Then, 325 parts of acrylic polymer JONREZ® H-2704 were added. The reaction temperature was maintained for an additional two hours at 275° C. The resulting polymer had an acid number of 11, a ring and ball softening point of 59° C., a DSC glass transition temperature of 5° C., a weight average molecular weight of 5300, a polydispersity of 30, a neat Gardner color value of 9.5, and a Brookfield viscosity at 145° C. of 500 cP (#18 spindle).

EXAMPLE 10

Preparation of Phase Change Ink 7513-88

To a 500-mL, five-neck, round-bottom flask equipped with an overhead stirrer, a nitrogen delivery tube, a thermocouple, and a stopper were added 20.0 parts of carnauba wax, 105.6 parts of paraffin wax, 22.2 parts of Elvax, and 72.2 parts of L1A Special fatty acid (Westvaco). The contents were heated to 135° C. under a nitrogen atmosphere. Then, 190.0 parts of rosin polymer 7485-70 were charged over a two-hour period. The contents were maintained at a temperature of 35° C. for an additional hour.

EXAMPLE 11

Preparation of Phase Change Ink 7513-89

To a 500-mL, five-neck, round-bottom flask equipped with an overhead stirrer, a nitrogen delivery tube, a thermocouple, and a stopper were added 20.0 parts of carauba wax, 105.6 parts of paraffin wax (Fluka Chemika), 22.2 parts of Elvax® 40W (ethylene vinyl acetate resin from E.I. DuPont de Nemours & Co., Inc.), and 72.2 parts of L1A Special fatty acid. The contents were heated to 35° C. under a nitrogen atmosphere. Then, 5.9 parts of JONREZ® H-2704 were charged over a two-hour period. The contents were maintained at a temperature of 135° C. for an additional hour.

EXAMPLE 12

Preparation of Phase Change Ink 7513-91

To a 500-mL, five-neck, round-bottom flask equipped with an overhead stirrer, a nitrogen delivery tube, a thermocouple, and a stopper were added 20.0 parts of carnauba wax (Aldrich), 105.6 parts of paraffin wax, 22.2 parts of Elvax® 40 W, and 72.2 parts of L1A Special fatty acid. The contents were heated to 135° C. under a nitrogen atmosphere. Then, 5.4 parts of rosin polymer 7485-70 and 1.4 parts of acrylic polymer JONREZ® H-2704 were charged over a two-hour period. The contents were maintained at a temperature of 135° C. for an additional hour.

EXAMPLE 13

Preparation of Phase Change Ink 7513-74

To a 500-mL, five-neck, round-bottom flask equipped with an overhead stirrer, a nitrogen delivery tube, a therrnocouple, and a stopper were added 20.0 parts of camauba wax, 105.6 parts of paraffin wax, 22.2 parts of Elvax® 40W, and 72.2 parts of L1A Special fatty acid. The contents were heated to 135° C. under a nitrogen atmosphere. Then, 132.0 parts of rosin/acrylic hybrid polymer 7490-97 were charged over a two-hour period. The contents were maintained at a temperature of 135° C. for an additional hour.

EXAMPLE 14

Rosin polymers provide phase change (hot melt) inks with flexibility and adhesion. In addition, the polymers can improve the dispersion of the colorant. Like hydrocarbon polymers, in some ink systems, rosin polymers cannot be used with acrylic polymers at a level that permits the benefit of both polymers to be achieved due to incompatibility of the polymers. As an example, a composition consisting of 105.6 parts of paraffin, 72.2 parts of Westvaco L1A Special fatty acid, 22.2 parts of Elvax® 40W, and 20.0 parts of carnauba wax was prepared. When 190.0 grams or more of rosin polymer 7485-70 was added to the composition, a compatible system resulted (Example 10). When 5.9 parts or more of acrylic polymer JONREZ® H-2704 were added to the same composition, an incompatible ink system was obtained (Example 11). By chemically attaching together 80 wt % of rosin polymer 7485-70 and 20 wt % of acrylic polymer JONREZ® H-2704, rosin/acrylic hybrid polymer 7490-97 was obtained (Example 9). This hybrid polymer was added at a level of 132.0 parts to the previous composition without an incompatible system resulting (Example 13). Adding the hybrid polymer to the composition is equivalent to adding 26.4 parts of acrylic polymer JONREZ® H-2704 and 105.6 parts of rosin polymer 7485-70.

To demonstrate the uniqueness of the hybrid approach in achieving a compatible system, a blend of 5.4 parts of rosin polymer 7485-70 and 1.4 parts of acrylic polymer JONREZ® H-2704 was added to the previous composition (Example 12). An incompatible ink system was obtained. Thus, a greater amount of an acrylic polymer can be incorporated in a wax/fatty acid/ethylene vinyl acetate-based phase change ink in the hybrid form than as a blend. The comparisons described in Examples 10–14 are summarized in Table II.

TABLE II

Phase Change Ink-Jet Ink Formulas

| | Ink 7513-88 | Ink 7513-89 | Ink 7513-91 | Ink 7513-74 |
|---|---|---|---|---|
| Paraffin, parts | 105.6 | 105.6 | 105.6 | 105.6 |
| Carnauba wax, parts | 20.0 | 20.0 | 20.0 | 20.0 |
| Elvax ®, parts | 22.2 | 22.2 | 22.2 | 22.2 |
| Westvaco L1A fatty acid, parts | 72.2 | 72.2 | 72.2 | 72.2 |
| Rosin polymer 7485-70, parts | 190.0 | | 5.4 | |
| JONREZ ® H-2704, parts | | 5.9 | 1.4 | |
| Hybrid Resin 7490-97, parts | | | | 132.0 |

TABLE II-continued

Phase Change Ink-Jet Ink Formulas

| | Ink 7513-88 | Ink 7513-89 | Ink 7513-91 | Ink 7513-74 |
|---|---|---|---|---|
| Compatible | yes | no | no | yes |

EXAMPLE 15

Preparation of Rosin/Polyurethane Hybrid Polymer 7485-57

To a three-liter, five-neck, round-bottom flask equipped with an overhead stirrer, a thermocouple, a condenser, and two stoppers were added 1,000 parts of Westvaco Rosin SS and 65.4 parts of L5 fatty acid. The contents were heated to a temperature of 185° C. Then, 65.4 parts of maleic anhydride were added. The temperature was increased to 205° C. and maintained for a period of one hour. Then, 131 parts of pentaerythritol and 4.4 parts of magnesium oxide were charged. A Dean-Stark trap was attached, and the contents were heated to a temperature of 270° C. over a one-hour period. The temperature was maintained at 270° C. for a period of one hour. Then 201 parts of polyurethane K-Flex® UD 320-100 were added. The temperature was maintained for an additional two hours at 270° C. The resulting polymer had an acid number of 8, a ring and ball softening point of 90° C., a DSC glass transition temperature of 44° C., a weight average molecular weight of 2,200, a polydispersity of 1.8, a neat Gardner color value of 17, and a Brookfield viscosity of 135 cP (#8 spindle).

EXAMPLE 16

Preparation of Phase Change Ink 7513-48D

To a 500-mL, five-neck, round-bottom flask equipped with an overhead stirrer, a nitrogen delivery tube, a thermocouple, and a stopper were added 20.0 parts of carnauba wax, 105.6 parts of paraffin wax, 22.2 parts of Elvax® 40W, and 72.2 parts of L1A Special fatty acid. The contents were heated to 135° C. under a nitrogen atmosphere. Then, 3.0 parts of K-Flex® PU UD-320-100 were charged.

EXAMPLE 17

Preparation of Phase Change Ink 7504-48A

To a 500-mL, five-neck, round-bottom flask equipped with an overhead stirrer, a nitrogen delivery tube, a thermocouple, and a stopper were added 20 parts of carnauba wax, 105.6 parts of paraffin wax, 22.2 parts of Elvax® 40W, and 72.2 parts of L1A Special fatty acid. The contents were heated to 135° C. under a nitrogen atmosphere. Then, 310.0 parts of rosin/polyurethane hybrid polymer 7485-57 were charged over a two-hour period. The contents were maintained at a temperature of 135° C. for an additional hour.

EXAMPLE 18

Polyurethane polymers provide phase change (hot melt) inks with excellent abrasion and chemical resistance. Rosin polymers provide phase change (hot melt) inks with flexibility and adhesion. In addition, rosin polymers can improve the dispersion of the colorant. In some ink formulations, polyurethane and rosin polymers, because of incompatibility of the polymers, cannot be used together at a level that allows the benefit of both polymers to be achieved. For example, a phase change ink composition consisting of 105.6 parts of paraffin, 72.2 parts of Westvaco L1A Special fatty acid, 22.2 parts of Elvax® 40W, and 20.0 parts of carnauba wax was prepared. When 190.0 parts or more of rosin polymer 7485-70 were added to the composition, a compatible ink system resulted (Example 11). Adding 3.0 parts or more of polyurethane polymer K-Flex®" PU UD-320-100 to the same composition resulted in an incompatible system (Example 16). By chemically attaching together 65 wt % of rosin polymer 7485-70 and 35 wt % of polyurethane polymer K-Flex® PU UD-320-100, rosin/polyurethane hybrid polymer 7485-57 was obtained (Example 15). This hybrid polymer was added at a level of 310.0 parts to the same ink composition without an incompatible system resulting (Example 17). Adding the hybrid polymer is equivalent to adding 108.5 parts of urethane polymer K-Flex® PU UD-320-1 00 and 201.5 parts of rosin polymer 7485-70. Thus, a much greater amount of a polyurethane polymer can be added to a wax/fatty acid/ethylene vinyl acetate-based phase change ink formulation in the hybrid form than alone. The comparisons described in Examples 16–18 are summarized in Table III.

TABLE III

Phase Change Ink-Jet Ink Formulas

| | Ink 7513-88 | Ink 7504-48D | Ink 7504-48A |
|---|---|---|---|
| Parafin wax, parts | 105.6 | 105.6 | 105.6 |
| Carnauba wax, parts | 20.0 | 20.0 | 20.0 |
| Elvax, parts | 22.2 | 22.2 | 22.2 |
| Westvaco L1A fatty acid, parts | 72.2 | 72.2 | 72.2 |
| Rosin Polymer 7485-70, parts | 190.0 | | |
| K-Flex ® PU UD-320-100, parts | | 3.0 | |
| Hybrid Polymer 7485-57, parts | | | 310.0 |
| Compatible | yes | no | yes |

EXAMPLE 19

The properties of several compositions prepared in previous examples were determined:

Flexibility of Printed Ink. A small aluminum dish was coated with a thin film of the hot melt ink, and the dish was stored at −4° C. for 15 minutes. The pan was then flexed back and forth at −4° C. to determine the flexibility of the different hot melt inks.

Offset Temperature (Block Resistance) of Printed Ink. A piece of uncoated, standard Nashua office paper was printed with a 1 mil thickness of the ink under examination. A second piece of uncoated paper was placed on top of the printed piece, and a pressure of 500 g/in$^2$ was applied for two minutes. This procedure was repeated at increasing temperature intervals of 5° C. for two minutes to determine the temperature where print transfer from the print to the uncoated paper occurred (the offset temperature).

Abrasion Resistance of Printed Ink. A piece of standard Nashua office paper coated with a 1 mil thickness of a hot melt ink was moved back and forth approximately 20 times over a similarly coated print using a Sutherland abrasion resistance tester equipped with a 2 lb. weight. The number and size of the resulting grooves and scratches in the prints were then evaluated.

Determination of Adhesion of Printed Ink. A steel bar containing a piece of scotch tape was placed in contact with another bar which had a piece of Nashua paper coated with a hot melt ink of 1 mil thickness fixed to it. The steel bars were pulled apart at a constant rate using a Monsanto Tel-Tak tack tester, and the print as well as the scotch tape were examined to determine the adhesion of the ink to the paper.

The results of the evaluation of the properties of the above-identified compositions are given in Table IV. The best flexibility, abrasion resistance, and adhesion were obtained with composition 7513-74.

TABLE IV

Properties of Phase Change (Hot Melt) Inks

| Ink | 7536-06 | 7513-74 | 7504-48A | 7536-09 |
|---|---|---|---|---|
| Hybrid Polymer | 7521-11 | 7490-97 | 7485-57 | 7585-70 |
| | Hydrocarbon/ acrylic | Rosin/acrylic | Rosin/ polyurethane | Rosin |
| Viscosity, cP | 75 | 55 | 135 | 50 |
| Flexibility | 8 | 9 | 7 | 9 |
| Offset Temp., ° C. | 55 | 60 | 60 | 45 |
| Abrasion Resistance | 6 | 7 | 4 | 5 |
| Adhesion | 7 | 9 | 8 | 8 |

From this disclosure it should be understood that the subject matter of this invention is:

(1) An ink jet ink composition comprising a colorant and a hybrid polymer;

(2) the ink jet ink composition of (1) wherein the composition is a phase change ink jet ink;

(3) the ink jet ink composition of (2) wherein the colorant is a member of the group of colorants selected from pigments, dyes, metals, metal oxides, and combinations thereof;

(4) The ink jet ink composition of (3) wherein the pigment is selected from the group of organic and inorganic water-insoluble colorants and combinations thereof;

(5) the ink jet ink composition of (4) wherein the pigment is selected from the group of pigments consisting of C.I. Pigment Yellow 1, C.I. Pigment Yellow 3, C.I. Pigment Yellow 13, C.I. Pigment Red 5, C.I. Pigment Red 7, C.I. Pigment Red 12, C.I. Pigment Red 112, C.I. Pigment Red 122, C.I. Pigment Blue 1, C.I. Pigment Blue 2, C.I. Pigment Blue 16, C.I. Vat Blue 4, and C.I. Vat Blue 6;

(6) the ink jet ink composition of (5) wherein the pigment is present in an amount of from about 0.1 to about 30 wt % and is characterized by a particle size of from about 0.1 to about 100 microns in diameter;

(7) the ink jet ink composition of (6) wherein the pigment is present in an amount of from about 2 to about 10 wt % and is characterized by a particle size of from about 0.01 to about 10 microns in diameter;

(8) the ink jet ink composition of (7) wherein the pigment is characterized by a particle size from about 0.01 to about 5 microns in diameter;

(9) the ink jet ink composition of (3) wherein the dye is selected from the group of dyes consisting of basic, acid, and direct dyes;

(10) the ink jet ink compositions of (3) wherein the dye is a reactive dye;

(11) the ink jet ink composition of (3) wherein the dye is present in an amount of from about 0.1 to about 30 wt %;

(12) The ink jet ink composition of (11) wherein the dye is present in an amount of from about 2 to about 10 wt %;

(13) the ink jet ink composition of (3) wherein the metals and metal oxides are selected from the group consisting of silica, alumina, titania, and finely divided copper;

(14) the ink jet ink composition of (2) wherein the hybrid polymer is characterized by a first polymer having chemically attached thereto a second polymer;

(15) the ink jet ink composition of (14) wherein the hybrid polymer is present in an amount to provide an amount from about 0.01% to about 30%, based on the weight of the polymer and wherein the polymer is characterized by an acid number from about 10 to about 300, a weight average molecular weight from about 500 to about 250,000, a softening point from about 0 to about 150° C., and a glass transition temperature from about −25 to 180° C.;

(16) the ink jet ink composition of (15) wherein the polymer is characterized by an acid number from about 20 to about 80, a weight average molecular weight from about 2,000 to about 35,000, a softening point from about 40 to 90° C., and a glass transition temperature from about 25 to about 80° C.;

(17) the ink jet ink composition of (14) wherein the polymer is selected from the group of naturally occurring polymers, synthetic analogues of naturally occurring polymers, synthetic polymers, and synthetic copolymers;

(18) the ink jet ink composition of (17) wherein the naturally occurring polymer is selected from the group of polymers consisting of alginic acid, carboxymethyl cellulose, and pectinic acid;

(19) the ink jet ink composition of (17) wherein the synthetic analogues of naturally occurring polymers is selected from the group of polymers consisting of rosin esters, lignosulfanates, nitrocellulose, and alcohol-soluble polysaccharides;

(20) the ink jet ink composition of (17) wherein the synthetic polymer is selected from the group of polymers consisting of polyacrylamide, polyacrylic acid, polyethylene oxide, polyethylene glycol, polymethacrylic acid, polyitaconic acid, polymaleic acid, polyvinyl alcohol, and polyvinyl methyl ether;

(21) the ink jet ink composition of (17) wherein the synthetic copolymer is selected from the group of polymers consisting of styrene/acrylic acid, ethylene/vinyl acetate, acrylic acid/N-vinyl pyrrolidinone, and vinylnaphthalene/itaconate copolymers;

(22) the ink jet ink composition of (17) wherein the hybrid polymer is prepared by a polymerization method selected from the group consisting of solution polymerization, emulsion polymerization, suspension polymerization, and bulk polymerization;

(23) the ink jet ink composition of (2) further comprising a member of the group consisting of wax, polymer, antioxidant, biocide, corrosion inhibitor, and a combination thereof;

(24) the ink jet ink composition of claim 23 wherein the wax is selected from the group consisting of petroleum wax, plant wax, animal wax, synthetic hydrocarbon wax higher fatty acid, higher alcohol, and a derivative thereof;

(25) the ink jet ink composition of (24) wherein the petroleum wax is a member of the group consisting of paraffin wax and micro crystalline wax;

(26) the ink jet ink composition of (24) wherein the plant wax is a member of the group consisting of candelilla wax and carnuba wax;

(27) the ink jet ink composition of (24) wherein the animal wax is a member of the group consisting of bees wax and lanolin;

(28) the ink jet ink composition of (24) wherein the synthetic hydrocarbon wax is a member of the group consisting of a Fisher-Tropsch wax and a polyethylene wax;

(29) the ink jet ink composition of (24) wherein the higher fatty acid is a member of the group consisting of stearic acid and lauric acid;

(30) the ink jet ink composition of (24) wherein the higher alcohol is selected from a member of the group consisting of stearyl alcohol and 12-hydroxystearic acid;

(31) the ink jet ink composition of (23) wherein the polymer is a member of the group consisting of alkyd resins, amides, acrylic polymers, benzoate esters, citrate plasticizers, cumarone-indene resins, dimer fatty acids, epoxy resins, fatty acids, ketone resins, maleate plasticizers, long chain alcohols, olefin resins, petroleum resins, phenolic resins, phthalate plasticizers, polyesters, polyvinyl alcohol resins, rosins, styrene resins, sulfones, sulfonamides, terpene resins, urethanes, vinyl resins, and derivatives and combinations thereof;

(32) the ink jet ink composition of (31) wherein the polymer is characterized by a melting point from about 40 to about 200° C. and a surface tension from about 20 to about 70 dynes/cm;

(33) the ink jet ink composition of (32) wherein the polymer is characterized by a melting point from about 60 to about 140° C. and a surface tension from about 30 to about 60 dynes/cm;

(34) the ink jet ink composition of (23) wherein the antioxidant is present in an amount from about 0.1% to about 1.0%, based on the weight of the ink composition;

(35) the ink jet ink composition of (23) wherein the biocide is present in an amount from about 0.01% to about 5.0%, based on the weight of the ink composition; and

(36) the ink jet ink composition of (23) wherein the corrosion inhibitor is present in an amount from about 0.1% to about 5.0%, based on the weight of the ink composition.

A further embodiment of the invention disclosed herein is:

(37) A method of printing comprising applying an ink jet ink composition comprising a colorant and a hybrid polymer on a substrate with a recording device;

(38) the method of (37) wherein the application of the ink composition on the substrate is conducted by thermally melting the ink at a temperature above ambient temperature;

(39) the method of (38) wherein the application of the ink is selected from the group consisting of hot melt ink jet and hot melt gravure;

(40) the method of (37) wherein the substrate is selected from the group consisting of porous substrates and nonporous substrates;

(41) the method of (40) wherein the porous substrate is selected from the group consisting of wood, paper, and textile;

(42) the method of (40) wherein the nonporous substrate is selected from the group consisting of glass, metal, and synthetic polymer film;

(43) the method of (42) wherein the metal is aluminum; and

(44) the method of (37) wherein the recording device is a piezo ink jet printer.

Modifications to this invention will occur to those skilled in this art. Therefore, it is to be understood that this invention is not necessarily limited to the particular embodiments disclosed; rather, it is intended to cover all modifications which are within the true spirit and scope of this invention, as disclosed and claimed herein.

What is claimed is:

1. A phase change ink jet ink composition comprising a colorant and a hybrid polymer comprising a first polymer having chemically attached thereto a second polymer, wherein the first polymer and second polymer are different polymers selected from the group consisting of naturally occurring polymers, synthetic analogues of naturally occurring polymers, synthetic polymers, and synthetic copolymers.

2. The ink jet ink composition of claim 1 wherein the colorant is a member of the group of colorants selected from pigments, dyes, metals, metal oxides, and combinations thereof.

3. The ink jet ink composition of claim 2 wherein the pigment is selected from the group of organic and inorganic water-insoluble colorants and combinations thereof.

4. The ink jet ink composition of claim 3 wherein the pigment is selected from the group of pigments consisting of C.I. Pigment Yellow 1, C.I. Pigment Yellow 3, C.I. Pigment Yellow 13, C.I. Pigment Red 5, C.I. Pigment Red 7, C.I. Pigment Red 12, C.I. Pigment Red 112, C.I. Pigment Red 122, C.I. Pigment Blue 1, C.I. Pigment Blue 2, C.I. Pigment Blue 16, C.I. Vat Blue 4, and C.I. Vat Blue 6.

5. The ink jet ink composition of claim 4 wherein the pigment is present in an amount of from about 0.1 to about 30 wt % and is characterized by a particle size of from about 0.1 to about 100 microns in diameter.

6. The ink jet ink composition of claim 5 wherein the pigment is present in an amount of from about 2 to about 10 wt % and is characterized by a particle size of from about 0.01 to about 10 microns in diameter.

7. The ink jet ink composition of claim 6 wherein the pigment is characterized by a particle size from about 0.01 to about 5 microns in diameter.

8. The ink jet ink composition of claim 2 wherein the dye is selected from the group of dyes consisting of basic, acid, and direct dyes.

9. The ink jet ink compositions of claim 2 wherein the dye is a reactive dye.

10. The ink jet ink composition of claim 2 wherein the dye is present in an amount of from about 0.1 to about 30 wt %.

11. The ink jet ink composition of claim 10 wherein the dye is present in an amount of from about 2 to about 10 wt %.

12. The ink jet ink composition of claim 2 wherein the metals and metal oxides are selected from the group consisting of silica, alumina, titania, and finely divided copper.

13. The ink jet ink composition of claim 1 wherein the hybrid polymer is present in an amount to provide an amount 0.01% to about 30%, based on the weight of the polymer in gel form and wherein the polymer is characterized by an acid number from about 10 to about 300, a weight average molecular weight from about 500 to about 250,000, a softening point from about 0 to about 150° C., and a glass transition temperature from about −25 to 180° C.

14. The ink jet ink composition of claim 13 wherein the polymer is characterized by an acid number from about 20 to about 80, a weight average molecular weight from about 2,000 to about 35,000, a softening point from about 40 to 90° C., and a glass transition temperature from about 25 to about 80° C.

15. The ink jet ink composition of claim 1 wherein the naturally occurring polymer is selected from the group of polymers consisting of alginic acid, carboxymethyl cellulose, and pectinic acid.

16. The ink jet ink composition of claim 1 wherein the synthetic analogues of naturally occurring polymers is selected from the group of polymers consisting of rosin esters, lignosulfanates, nitrocellulose, and alcohol-soluble polysaccharides.

17. The ink jet ink composition of claim 1 wherein the synthetic polymer is selected from the group of polymers consisting of polyacrylamide, polyacrylic acid, polyethylene oxide, polyethylene glycol, polymethacrylic acid, polyitaconic acid, polymaleic acid, polyvinyl alcohol, and polyvinyl methyl ether.

18. The ink jet ink composition of claim 1 wherein the synthetic copolymer is selected from the group of polymers consisting of styrene/acrylic acid, ethylene/vinyl acetate, acrylic acid/N-vinyl pyrrolidinone, and vinylnaphthalene/itaconate copolymers.

19. The ink jet ink composition of claim 1 wherein the hybrid polymer is prepared by a polymerization method selected from the group consisting of solution polymerization, emulsion polymerization, suspension polymerization, and bulk polymerization.

20. The ink jet ink composition of claim 1 further comprising a member of the group consisting of wax, polymer, antioxidant, biocide, corrosion inhibitor, and a combination thereof.

21. The ink jet ink composition of claim 20 wherein the wax is selected from the group consisting of petroleum wax, plant wax, animal wax, synthetic hydrocarbon wax higher fatty acid, higher alcohol, and a derivative thereof.

22. The ink jet ink composition of claim 21 wherein the petroleum wax is a member of the group consisting of paraffin wax and micro crystalline wax.

23. The ink jet ink composition of claim 21 wherein the plant wax is a member of the group consisting of candelilla wax and carnuba wax.

24. The ink jet ink composition of claim 21 wherein the animal wax is a member of the group consisting of bees wax and lanolin.

25. The ink jet ink composition of claims wherein the synthetic hydrocarbon wax is a member of the group consisting of a Fisher-Tropsch wax and a polyethylene wax.

26. The ink jet ink composition of claim 21 wherein the higher fatty acid is a member of the group consisting of stearic acid and lauric acid.

27. The ink jet ink composition of claim 21 wherein the higher alcohol is selected from a member of the group consisting of stearyl alcohol and 12-hydroxystearic acid.

28. The ink jet ink composition of claim 20 wherein the polymer is a member of the group consisting of alkyd resins, amides, acrylic polymers, benzoate esters, citrate plasticizers, cumarone-indene resins, dimer fatty acids, epoxy resins, fatty acids, ketone resins, maleate plasticizers, long chain alcohols, olefin resins, petroleum resins, phenolic resins, phthalate plasticizers, polyesters, polyvinyl alcohol resins, rosins, styrene resins, sulfones, sulfonamides, terpene resins, urethanes, vinyl resins, and derivatives and combinations thereof.

29. The ink jet ink composition of claim 28 wherein the polymer is characterized by a melting point from about 40 to about 200° C. and a surface tension from about 20 to about 70 dynes/cm.

30. The ink jet ink composition of claim 29 wherein the polymer is characterized by a melting point from about 60 to about 140° C. and a surface tension from about 30 to about 60 dynes/cm.

31. The ink jet ink composition of claim 20 wherein the antioxidant is present in an amount from about 0.1% to about 1.0%, based on the weight of the ink composition.

32. The ink jet ink composition of claim 20 wherein the biocide is present in an amount from about 0.01% to about 5.0%, based on the weight of the ink composition.

33. The ink jet ink composition of claim 20 wherein the corrosion inhibitor is present in an amount from about 0.1% to about 5.0%, based on the weight of the ink composition.

34. A method of printing comprising applying an ink jet ink composition comprising a colorant and a hybrid polymer on a substrate with a recording device wherein the hybrid polymer comprises a first polymer having chemically attached thereto a second polymer, wherein the first polymer and second polymer are different polymers selected from the group consisting of naturally occurring polymers, synthetic analogues of naturally occurring polymers, synthetic polymers, and synthetic copolymers.

35. The method of claim 34 wherein the application of the ink composition on the substrate is conducted by thermally melting the ink at a temperature above ambient temperature.

36. The method of claim 35 wherein the application of the ink is selected from the group consisting of hot melt ink jet and hot melt gravure.

37. The method of claim 34 wherein the substrate is selected from the group consisting of porous substrates and nonporous substrates.

38. The method of claim 37 wherein the porous substrate is selected from the group consisting of wood, paper, and textile.

39. The method of claim 37 wherein the nonporous substrate is selected from the group consisting of glass, metal, and synthetic polymer film.

40. The method of claim 39 wherein the metal is aluminum.

41. The method of claim 34 wherein the recording device is a piezo ink jet printer.

* * * * *